(No Model.)
W. HOSKINS.
METHOD OF AND APPARATUS FOR TESTING GLASS.
No. 552,641. Patented Jan. 7, 1896.
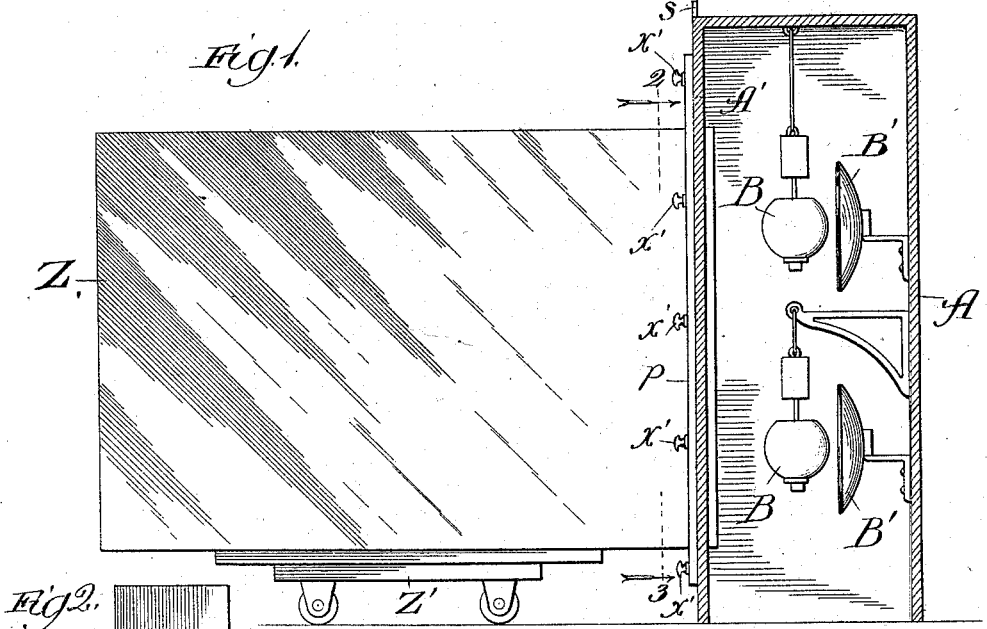
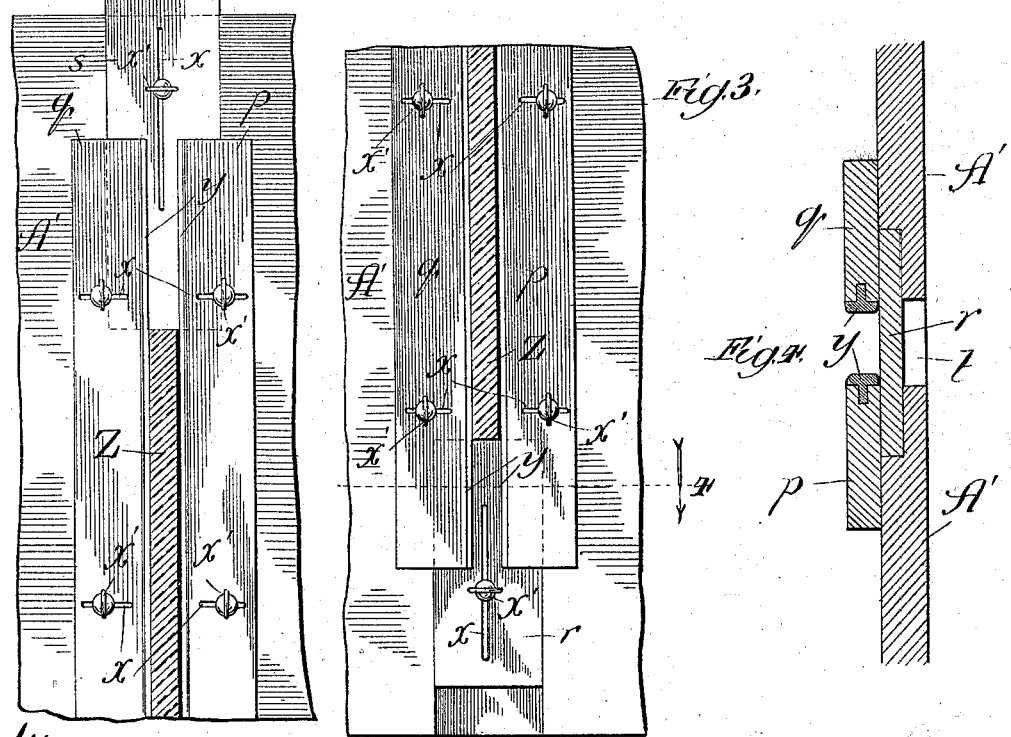
Witnesses:
Chas. E. Gaylord,
Lute J. Alter
Inventor:
William Hoskins,
By Dyrenforth & Dyrenforth
Attys.

UNITED STATES PATENT OFFICE.

WILLIAM HOSKINS, OF CHICAGO, ILLINOIS.

METHOD OF AND APPARATUS FOR TESTING GLASS.

SPECIFICATION forming part of Letters Patent No. 552,641, dated January 7, 1896.

Application filed January 21, 1895. Serial No. 535,610. (No model.)

*To all whom it may concern:*

Be it known that I, WILLIAM HOSKINS, a citizen of the United States, residing at Chicago, in the county of Cook and State of Illinois, have invented a new and useful Improvement in Methods of and Apparatus for Testing Glass, of which the following is a specification.

My invention relates to an improved method of testing sheets or plates of transparent or pellucid glass for the purpose of discovering any imperfections that may exist therein and with a view to grading them, and my invention further relates to improved apparatus for use in carrying out the said method.

The quality and value, especially of plate-glass, are determined largely by its freedom from blemishes of any character which would detract from its clearness; and defects or blemishes may be due to the presence in the glass of air or gas bubbles or opaque particles, to the lack of solution of substances in the glass resulting from imperfect fusion, to surface scratches or imperfect polishing, to variation in density of glass, and other causes.

The inspection more especially of plate-glass as hitherto practiced has required the services of skilled labor of a comparatively high order and the operation has been necessarily slow and laborious, because every portion of the glass had to be minutely examined against a light moved across the opposite side thereof, and viewed from different angles to detect the less apparent blemishes. Plate-glass for use in the manufacture of high-class mirrors, for example, should be absolutely free from any of the imperfections above noted, because defects which in a transparent glass would pass unnoticed will show plainly in a mirror and detract from its value.

My object is to provide a new and improved method of testing plate or sheet glass for the purpose of determining its quality or grade, which consists in temporarily applying to the edge of the plate a shielded illuminator and causing the illuminator to cast its light laterally through the plate by way of the edge thereof; and my object is also to provide improved apparatus whereby my said method may be quickly and conveniently carried out to bring prominently into view any of the various imperfections which may exist in the glass.

In the drawings I illustrate apparatus for use more especially in testing plate-glass of comparatively large dimensions.

Figure 1 is a view in sectional elevation of the apparatus and showing a way of applying it to the glass to illuminate the latter; Figs. 2 and 3, enlarged broken sectional views respectively of the upper and lower end portions of the apparatus, the sections being taken on lines 2 and 3 of Fig. 1; and Fig. 4, an enlarged section taken on line 4 of Fig. 3.

A is a shield or casing of opaque material, preferably closed on all sides except for a vertical slot or opening $t$ in its front side A'. In the casing are one or more illuminators B, which may be electric-arc lights, as shown, and provided with reflectors B'. At the upper and lower ends of the casing are opaque vertically-movable slides $s$ $r$, respectively, which may be set into recesses across the slot $t$ to extend flush with the front of the case. Mounted at opposite sides of the slot $t$ are opaque vertically-extending and horizontally-movable slides $q$ $p$. The slides may all be provided with slots $x$ elongated in the direction in which they move and with thumb-screws $x'$ extending through the slots, whereby the slides may be fastened in adjusted position. I prefer to line the adjacent edges of the slides $p$ $q$ with strips $y$ of rubber or other yielding material.

In operation the glass plate Z to be tested may be supported on edge upon a suitable carriage Z' and inserted at one of its vertical edges through the slot $t$ of the casing A. The plate should extend preferably at right angles to the casing to be in line with the illuminators. When the plate is inserted the slides $s$, $r$, $p$ and $q$ should be moved against the adjacent surfaces of the plate and fastened with the thumb-screws. When the illuminators B are turned on, light will be cast through the plate by way of the edge thereof. The angles of incidence and reflection of the rays passing through the glass are sufficiently oblique to cause substantially all the rays to zigzag between the surfaces thereof without passing beyond either surface, provided the surfaces are substantially parallel and no imperfections exist in the glass. Any opaque particles, air-bubbles, changes in density or other defects above noted, however, will deflect the rays which strike them and cause the rays to issue beyond the plate, whereby the said defects are intensified in the sense of becoming prominently perceptible. The method is best carried out in a dark room, and for that reason I prefer to shut off the light at all sides from the illuminators so that no rays will escape therefrom except through the edge of the glass. The effect of the light upon any imperfections in the glass is apparently to exaggerate them and render them so pronounced in appearance that an entire plate may be inspected at a glance, and no skilled labor is necessary to determine its quality.

One or more shielded illuminators at the edge of a plate are all that is necessary to render apparent any imperfections in a plate of comparatively large size; but if desired, two illuminator-casings A may be provided and rendered adjustable toward and away from each other, or otherwise, to receive opposite edges of a plate Z.

It will be understood that while the apparatus above described affords a desirable means for carrying out my method, the latter may be practiced with apparatus variously modified.

What I claim as new, and desire to secure by Letters Patent, is—

1. The method of testing sheet or plate glass, which consists in subjecting the plate or sheet of glass to light at its edge whereby any imperfection in the glass is indicated by the refraction or reflection through the side of the glass, of the light entering said edge, substantially as described.

2. In a plate or sheet glass testing apparatus, a shield provided with a slot for the edge of a glass plate or sheet to be tested, and an illuminator supported at the side of the shield opposite that at which the glass is presented, all constructed to operate substantially as described.

3. In a plate or sheet glass testing apparatus, a shield provided with a slot for the edge of a glass plate or sheet to be tested, means for increasing and diminishing the size of the slot at will, and an illuminator supported at the side of the shield opposite that at which the glass is presented, all constructed to operate, substantially as described.

WILLIAM HOSKINS.

In presence of—
J. H. LEE,
M. J. FROST.